(12) United States Patent
Fallah et al.

(10) Patent No.: US 7,236,107 B2
(45) Date of Patent: Jun. 26, 2007

(54) SYSTEM AND METHOD FOR IDENTIFYING OPTIMAL ENCODING FOR A GIVEN TRACE

(75) Inventors: Farzan Fallah, San Jose, CA (US); Yazdan Aghaghiri, Los Angeles, CA (US); Massoud Pedram, Los Angeles, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/945,330

(22) Filed: Sep. 20, 2004

(65) Prior Publication Data

US 2006/0061492 A1    Mar. 23, 2006

(51) Int. Cl.
*H03M 7/38* (2006.01)

(52) U.S. Cl. .......................................... 341/51; 341/50

(58) Field of Classification Search .................. 341/51, 341/50
See application file for complete search history.

(56) References Cited

U.S. PATENT DOCUMENTS

| | | | | |
|---|---|---|---|---|
| 4,099,257 | A | 7/1978 | Arnold et al. ............... | 364/900 |
| 5,627,994 | A | 5/1997 | Levy et al. .................. | 395/477 |
| 5,689,712 | A | 11/1997 | Heisch ........................ | 395/704 |
| 5,805,863 | A | 9/1998 | Chang ......................... | 395/500 |
| 5,872,730 | A | 2/1999 | Shevach et al. ............. | 364/737 |
| 5,915,114 | A | 6/1999 | McKee et al. ............... | 395/704 |
| 5,964,893 | A | 10/1999 | Circello et al. ............... | 714/39 |
| 6,115,809 | A | 9/2000 | Mattson, Jr. et al. ....... | 712/239 |
| 6,189,141 | B1 | 2/2001 | Benitez et al. ................. | 717/4 |
| 6,205,545 | B1 | 3/2001 | Shah et al. .................. | 712/237 |
| 6,226,613 | B1 | 5/2001 | Turin .......................... | 704/256 |
| 6,233,284 | B1 * | 5/2001 | Townshend .................. | 375/242 |
| 6,260,108 | B1 | 7/2001 | Barve et al. ................. | 711/112 |
| 6,418,552 | B1 | 7/2002 | Osborn ........................ | 716/15 |
| 6,430,675 | B1 | 8/2002 | Hsu et al. .................... | 712/205 |
| 6,453,411 | B1 | 9/2002 | Hsu et al. .................... | 712/237 |
| 6,470,492 | B2 | 10/2002 | Bala et al. ................... | 717/128 |
| 6,738,518 | B1 * | 5/2004 | Minka et al. ................ | 382/218 |
| 2001/0029600 | A1 | 10/2001 | Lee et al. ..................... | 716/17 |
| 2002/0104075 | A1 | 8/2002 | Bala et al. ................... | 717/136 |
| 2002/0161989 | A1 | 10/2002 | Swaine ........................ | 712/227 |
| 2002/0194453 | A1 * | 12/2002 | Fallah et al. ................. | 711/220 |
| 2003/0018470 | A1 | 1/2003 | Golden et al. ................ | 704/10 |

OTHER PUBLICATIONS

Great Lakes Symposium on VLSI Mar. 13-15, 1997 Sponsored by IEEE Computer Society, IEEE Circuits and Systems Society, University of Illinois Urbana Champaign Illinois.*

P.C. Li and I.N. Hajj, "Computer-Aided Redesign of VLSI Circuits for Hot-Carrier Reliability," *Proc. of International Conference on Computer Design*, vol. 15, No. 5 (ISSN 0278-0070), 13 pgs., May 1996.

C. Chang, K. Wang, and M. Marek-Sadowska, "Layout-Driven Hot-Carrier Degradation Minimization Using Logic Restructuring Techniques," *Proc. Design Automation Conference*, pp. 97-102, month unknown, 2001.

(Continued)

*Primary Examiner*—Rexford Barnie
*Assistant Examiner*—Joseph Lauture
(74) *Attorney, Agent, or Firm*—Baker Botts L.L.P.

(57) ABSTRACT

A method for reducing transitions on a bus is provided that includes receiving an input trace and constructing a Markov source correlating to the input trace. The method also includes identifying an encoding technique, which can either minimize or maximize an objective function associated with the input trace.

34 Claims, 3 Drawing Sheets

OTHER PUBLICATIONS

K. Roy and S. Prasad, "Logic Synthesis for Reliability—An Early Start to Controlling Electromigration and Hot Carrier Effects," *Proc. Design Automation and Test in Europe*, cover pg. and pp. 136-141, Sep. 19-23, 2004.

A. Dasgupta and R. Karri, "Electromigration and Reliability Enhancement Via Bus Activity Distribution," *Proc. Design Automation Conference*, 6 pgs., month unknown, 1996.

G.S. Bhat and C.D. Savage, "Balanced Gray Codes," *Electronic Journal of Combinatorics 3*, No. 1, R25, pp. 1-11, month unknown, 1996.

L. Benini, G. De Micheli, E. Macii, D. Sciuto, and C. Silvano, "Asymptotic Zero-Transition Activity Encoding for Address Buses in Low-Power Microprocessor-Based Systems," IEEE *7th Great Lakes Symposium on VLSI*, Urbana, IL, cover pg. and pp. 77-82, Mar. 13-15, 1997.

W. Fornaciari, M. Polentarutti, D. Sciuto, and C. Silvano, "Power Optimization of System-Level Address Buses based on Software Profiling," *Proc. International Symposium on Hardware/Software Codesign*, pp. 29-33, Apr. 2000.

A. Abdollahi, F. Fallah, and M. Pedram, "Runtime Mechanisms for Leakage Current Reduction in CMOS VLSI Circuits," *Proc. Intl. Symposium on Low Power Electronics and Design*, pp. 213-218, Aug. 2002.

Benini, et al., "*System-Level Power Optimization of Special Purpose Applications: The Beach Solution*," (pp. 24-29), no date.

"*Combating Hot Carrier Effects via Bit-level Transition Balancing for On-chip Buses.*", no date.

Abdollahi, et al., "*Runtime Mechanisms for Leakage Current Reduction in CMOS VLSI Circuits,*" ISLPED '02, Aug. 12-14, 2002, Monterrey, California, USA. Copyright 2002 ACM 1-58113-475-4/02/0008 (six pages).

* cited by examiner

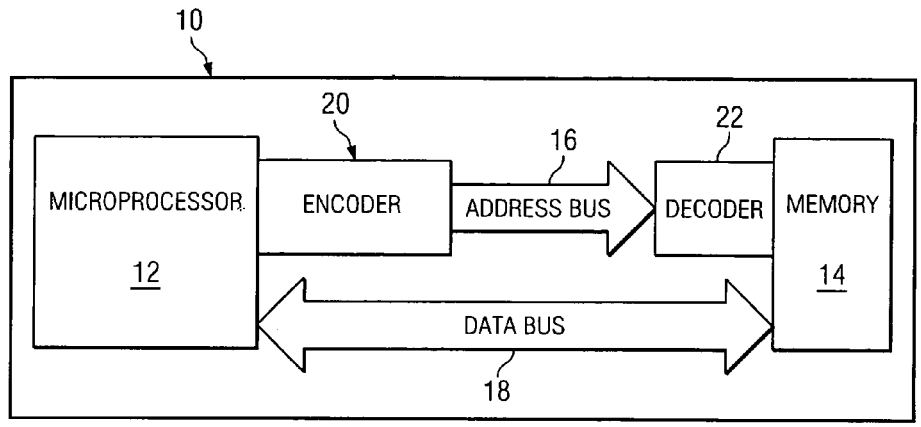
*FIG. 1A*
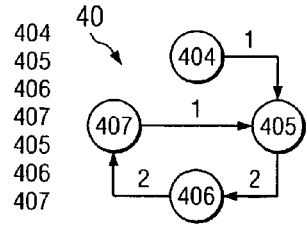
*FIG. 1B*
- FIND A ONE-TO-ONE MAPPING
  - $S_i \Rightarrow F(S_i)$
  - $\forall i,j\ i \neq j \Rightarrow F(S_i) \neq F(S_j)$
- CHOOSE AN OBJECTIVE FUNCTION
  - MIN $\sum_{i,j} |e_{i,j}| \times |F(S_i) \oplus F(S_j)|$
*FIG. 1C*
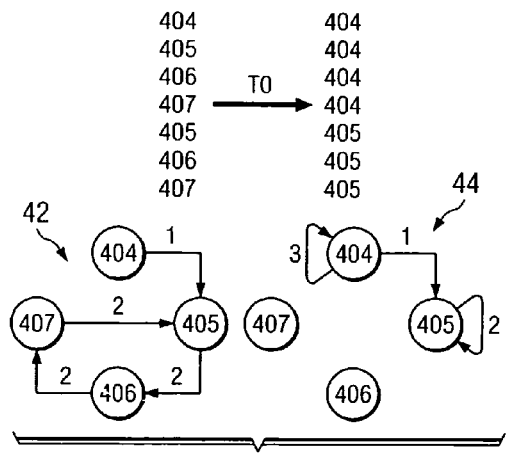
MIN $\sum_{i,j} |e_{i,j}| \times |F(S_i) \oplus F(S_j)|$
$\forall i,j\ F(S_i) \neq F(S_j)$
*FIG. 1D*
*FIG. 1E*

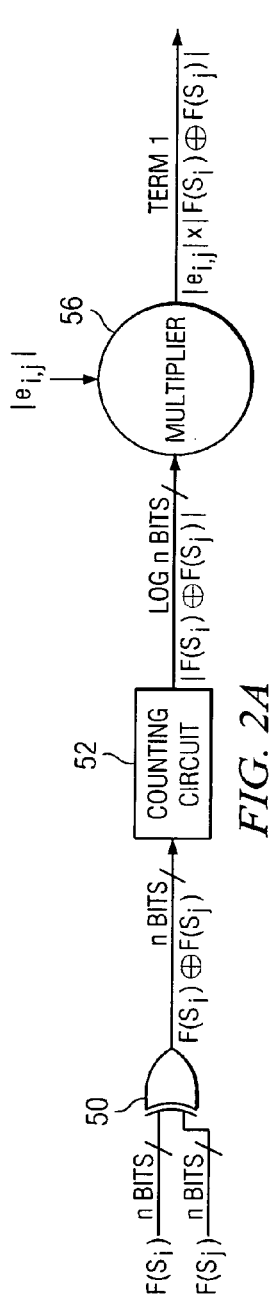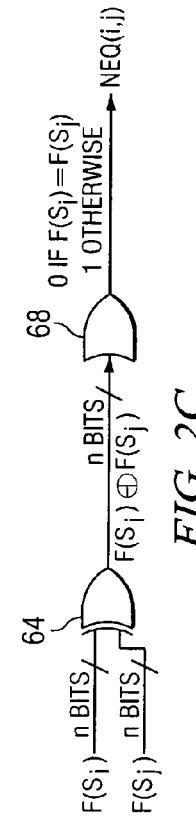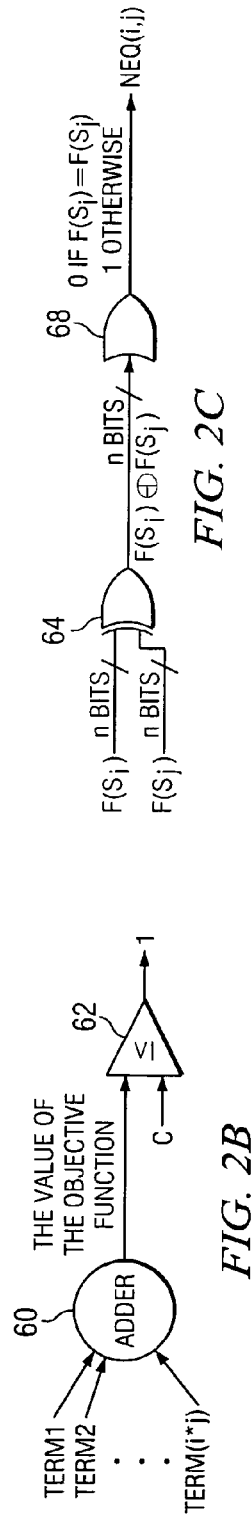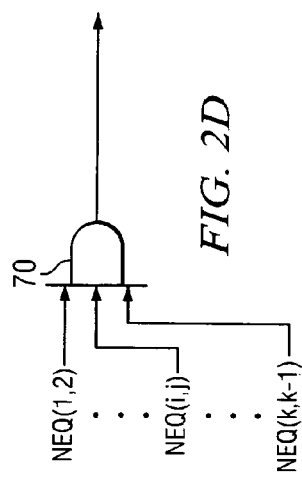

SYSTEM AND METHOD FOR IDENTIFYING OPTIMAL ENCODING FOR A GIVEN TRACE

TECHNICAL FIELD OF THE INVENTION

The present invention relates generally to circuit design and, more particularly, to a system and method for identifying optimal encoding for a given trace.

BACKGROUND OF THE INVENTION

The proliferation of integrated circuits has placed increasing demands on the design of digital systems included in many devices, components, and architectures. The number of digital systems that include integrated circuits continues to steadily increase and may be driven by a wide array of products and systems. Added functionalities may be implemented in integrated circuits in order to execute additional tasks or to effectuate more sophisticated operations in their respective applications or environments.

Current computer processors that are associated with integrated circuits have a number of input-output (I/O) pins that dissipate a significant amount of energy. Many of the I/O pins are dedicated to interfacing to external memory chips through instruction address and data address buses or a multiplexed bus, which can be used for both data and instruction addresses. The amount of energy dissipated from the I/O pins can be significant when compared to the total chip power consumption. In addition, a given communication channel (e.g. a bus) may suffer from wear and tear degradations and inadequate bit error rates. These deficiencies provide a significant challenge to system designers and component manufacturers who are relegated the task of alleviating such problems.

SUMMARY OF THE INVENTION

In accordance with the present invention, techniques for reducing transitions on associated buses are provided. According to particular embodiments, these techniques can reduce power consumption of electronic devices by reducing switching on the busses.

According to a particular embodiment, a method for reducing transitions on a bus is provided that includes receiving an input trace and constructing a Markov source correlating to the input trace. The method also includes identifying an encoding technique, which can either minimize or maximize an objective function associated with the input trace.

Embodiments of the invention may provide various technical advantages. Certain embodiments provide for a significant reduction in switching activity associated with a given address bus. Minimal switching activity generally yields a reduction in power consumption, an alleviation of wear on the communication channel, and an improved bit error rate. Thus, such an approach generally reduces switching activity, augments system performance, and can even be used to accommodate increased bandwidth.

Other technical advantages of the present invention will be readily apparent to one skilled in the art. Moreover, while specific advantages have been enumerated above, various embodiments of the invention may have none, some, or all of these advantages.

BRIEF DESCRIPTION OF THE DRAWINGS

For a more complete understanding of the present invention and its advantages, reference is now made to the following descriptions, taken in conjunction with the accompanying drawings, in which:

FIG. 1A illustrates a system for encoding communications sent across memory buses according to various embodiments of the present invention;

FIGS. 1B–1E are a simplified schematic diagrams illustrating various example algorithms associated with the system of FIG. 1A;

FIG. 2A is a simplified schematic diagram of an example construction of a circuit, which may model an objective function in the system of FIG. 1A;

FIG. 2B is a simplified schematic diagram of an example adder, which may be used to identify the value of the objective function;

FIG. 2C is a simplified schematic example of a one-to-one mapping associated with the system of FIG. 1A;

FIG. 2D is a simplified diagram of an example AND gate to be used in the system of FIG. 1A;

DETAILED DESCRIPTION OF THE DRAWINGS

Figure 3:
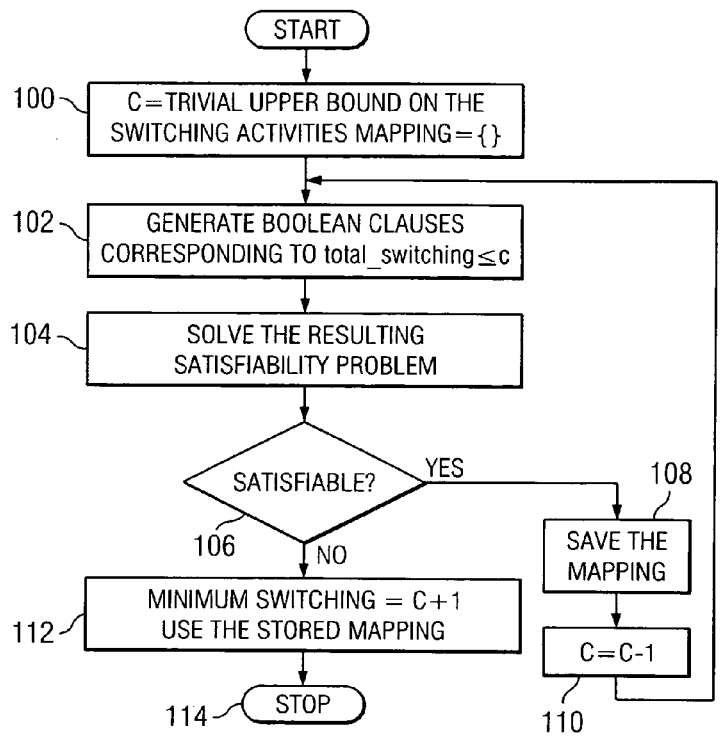
FIG. 3 is a simplified flowchart illustrating a series of steps associated with an encoding operation executed in the system of FIG. 1A.

FIG. 1A is a portion of a processing system 10 for encoding communications sent across memory buses that includes a microprocessor 12 and a memory 14 coupled to each other using an address bus 16 and a data bus 18. To reduce transitions on address bus 16, system 10 includes an encoder 20 that couples between microprocessor 12 and address bus 16. System 10 also includes a decoder 22 that couples between address bus 16 and memory 14. In general, encoder 20 and decoder 22 reduce transitions on address bus 16 using one or more encoding techniques. It will be understood that while these techniques are described using address bus 16, system 10 may use the invention to reduce transitions in a multiplexed bus (not shown) or on other buses where appropriate.

System 10 operates to implement an algorithm for automatic encoding generation. The algorithm identifies an optimal encoding technique for a given trace or for a set of traces, which optimizes an objective function. A Boolean satisfiability equation may be used in conjunction with the algorithm to save development time and to improve performance. Such an approach reduces the size of the problem in order to improve system efficiency.

Microprocessor 12 may be included in any appropriate arrangement and, further, include algorithms embodied in any suitable form (e.g. software, hardware, etc.). For example, microprocessor 12 may be part of a simple integrated chip, an application specific integrated circuit (ASIC), a field programmable gate array (FPGA), or any other suitable processing object, device, or component. Address bus 16 and data bus 18 are wires capable of carrying data (e.g. binary data). Alternatively, such wires may be replaced with any other suitable technology (e.g. optical radiation, laser technology, etc.) operable to facilitate the propagation of data.

Memory 14 is a storage element operable to maintain information that may be accessed by microprocessor 12. Memory 14 may be a random access memory (RAM), a read only memory (ROM), software, an algorithm, an erasable programmable ROM (EPROM), an electrically erasable programmable ROM (EEPROM), a fast cycle RAM (FCRAM), a static RAM (SRAM), or any other suitable object that is operable to facilitate such storage operations. In other embodiments, memory 14 may be replaced by another processor or software that is operable to interface with microprocessor 12.

In one aspect of operation, microprocessor 12 requests communications of data to and from memory 14 using address bus 16. Microprocessor 12 and memory 14 exchange data on data bus 18 based on the values propagating along address bus 16. Setting values on address bus 16 and data bus 18 uses power, often proportionate to the number of changes in the value along the corresponding bus. Thus, reducing changes between spatially local addresses on address bus 16 reduces transitions and can reduce power consumption of the bus. Therefore, the addition of encoder 20 and decoder 22 can produce a net decrease in power consumption of system 10 by reducing transitions on address bus 16. To reduce transitions on address bus 16, encoder 20 and decoder 22 use one or more techniques (detailed herein) designed to reduce changes in spatially local values communicated on address bus 16.

Note that for purposes of teaching and discussion, it is useful to provide some background overview as to the way in which the tendered invention operates. The following foundational information describes one problem that may be solved by the present invention. This background information may be viewed as a basis from which the present invention may be properly explained. Such information is offered earnestly for purposes of explanation only and, accordingly, should not be construed in any way to limit the broad scope of the present invention and its potential applications.

Most communication systems involve a sender (of information) and a receiver (of the sent information). Between the sender and the receiver lies a communication channel. Such a communication channel generally suffers from a number of problems. For example, wear and tear on the communication channel can cause degradation for associated components. In addition, bit error rate issues that are present in the communication channel can inhibit system performance. In other cases, excessive power consumption may cause a problem (e.g. heat dissipation issues) for the architecture. In the context of FIG. 1A, encoder 20 may reside in the sending portion of the architecture, while decoder 22 may reside in the receiving portion of the architecture.

From this framework, an optimal encoding technique needs to be developed for a given trace. The term "optimal" may refer to the best or to the preferred technique for encoding such that a mean minimum average of switching activity or a balanced switching activity scenario is achieved. Consider an example involving microprocessor 12 and memory 14, whereby microprocessor 12 sends addresses to memory 14 (via address bus 16) in order to get data from memory 14. The data may then properly propagate back to microprocessor 12 via data bus 18.

FIG. 1B is a simplified schematic diagram illustrating an example algorithm associated with the system of FIG. 1A. A trace represents the input of system 10 and is illustrated as the group of numbers on the left-hand side of FIG. 1B. The algorithm of FIG. 1B can model the trace using a Markov source; this is indicated generally at 40. There are a number of nodes that correspond to the numbers of the trace (e.g. 404, 405, etc.). Note that between node 404 and node 405 is an edge (or transition), which has a weight equal to 1. What needs to be ascertained at this point is a one-to-one mapping from the numbers in the trace to another set of numbers in a way that minimizes (or that achieves balance in) switching activities.

FIG. 1C is a simplified diagram illustrating several operations associated with system 10 of FIG. 1A. The first set of equations reflect the identification of a one-to-one mapping identified above, where S is the original input and where i and j are different. The subsequent equation reflects an objective function that is chosen, which yields a minimum sum of switching activities. Note that if nodes 404 and 405 are sent over address bus 16, there will be one switching activity on the least significant bit on the bus. However, if node 404 is sent again (instead of sending 405), then no switching activity will be present. This lack of switching activity is a superior arrangement because it consumes less power. Note also that the subsequent equation (i.e. the last equation of FIG. 1C) also includes a multiplier, which takes into account the number-of times a transition is made between i and j and vice versa. The sum of this equation is obtained for all values of i and j.

FIG. 1D is a simplified diagram illustrating algorithms associated with system 10 of FIG. 1A. A set of Boolean and arithmetic functions and constraints are thus provided, which can be modeled using a Boolean satisfiability (SAT) problem. Hence, Boolean clauses may be provided for addition, multiplication, XOR, and other operators used in the constraints. After that, a SAT solver may be employed to find the solution. In many cases, the size of the problem is large. In order to address this problem a T0 encoding technique may be used, which results in a reduction in the size of the SAT problem.

FIG. 1E is a simplified schematic diagram associated with system 10 of FIG. 1A. FIG. 1E includes a first Markov source model 42 and a second Markov source model 44. In this scenario, T0 encoding is employed. This results in a new trace (source model 44) that includes fewer edges and nodes. Note that this is reflected in the fact that nodes 406 and 407 have not been used in source model 44 (i.e. no edges to these nodes). This results in a reduction in the problem, which expedites the optimization operation associated with system 10.

FIGS. 2A–D are simplified schematic diagrams associated with modeling operations related to system 10. FIG. 2A shows construction of a circuit, which models the objective function identified above. FIG. 2A includes an XOR gate 50, a counting circuit 52, and a multiplier 56, which yields a term of 1. FIG. 2B shows an adder 60, which can be used to identify the value of the objective function. Element 62 may be used to compare the value with a constant (C), where again a term of 1 is produced. FIG. 2C illustrates the one-to-one mapping described above. The diagram includes an XOR gate 64, as well as a reduction OR gate 68, which calculates the OR of n bits. This yields a value of 0 if F(Si)=F(Sj) and a value of 1 otherwise. FIG. 2D illustrates an AND gate 70. From this point, a circuit has been constructed, which provides: 1) whether an encoding (i.e., function F(s) is one-to-one); and 2) the level of switching activity. Each gate of a circuit can then be modeled using Boolean expressions. A comparator circuit can then be used to find out whether the value of the objective function is less than a constant C. A Boolean satisfiability solver may then be utilized to find a solution for the set of Boolean expressions. If a solution exists, then a successful encoding is achieved, which reduces the sum of switching activities to less than C.

FIG. 3 is a simplified example flowchart illustrating a series of steps associated with the present invention. FIG. 3 reflects a method for encoding communications sent across address bus 16. The following description focuses on the operation of encoder 20. However, as noted, system 10 contemplates using any suitable combination and arrangement of functional elements for providing these operations, and these techniques can be combined with other techniques as appropriate.

The method may begin at step 100, where C is provided as the trivial upper bound on the switching activities, whereby mapping={ }. At step 102, Boolean clauses are generated corresponding to total switching$\leq$C. At step 104, the resulting satisfiability problem may be solved. At step 106, it is ascertained whether or not the problem is satisfiable. If "YES" then the process moves to step 108, where the mapping may be saved. From step 108, the process may proceed to step 110 where the equation C=C−1 may be verified. From this point, the process may move to step 102 and continue from there. If at step 106, the satisfiability problem is satisfiable, then the process may forward to step 112, where the minimum switching=C+1. The stored mapping may be used as this point. The process may then stop at step 114.

Some of the steps illustrated in FIG. 3 may be changed or deleted where appropriate and additional steps may also be added to the flowchart. These changes may be based on specific communication system architectures or particular arrangements or configurations and do not depart from the scope or the teachings of the present invention. It is also critical to note that the preceding description details a number of techniques for reducing transitions on address bus 16. While these techniques have been described in particular arrangements and combinations, system 10 contemplates encoder 20 using any appropriate combination and ordering of these operations to provide for decreased transitions on address bus 16.

Figure 4A:
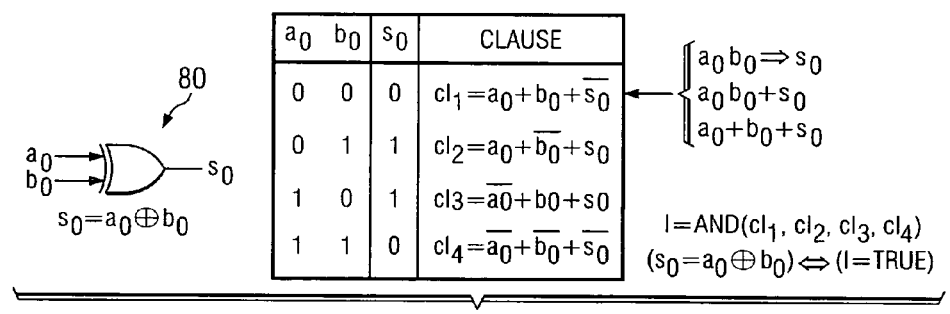
FIG. 4A is a simplified schematic diagram illustrating an example XOR gate, which may be used in the system of FIG. 1A.
Figure 4B:
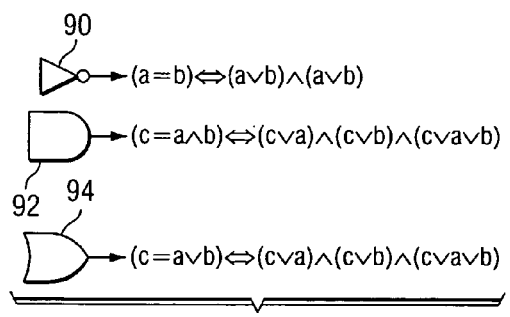
FIG. 4B is a simplified schematic diagram illustrating other example components, which may be used in the system of FIG. 1A.

FIG. 4A is a simplified schematic illustrating an example XOR gate 80. The schematic of FIG. 4A reflects modeling of XOR gate 80 using the outlined Boolean expressions. These operations may be executed as detailed above in the preceding description. FIG. 4B is a simplified schematic illustrating other example components, including: an inverter 90, and an AND gate 92, and an OR gate 94. The arrangements reflect other gates that may be modeled using the provided Boolean expressions as outlined herein.

Although the present invention has been described in detail with reference to particular embodiments illustrated in FIGS. 1A through 4B, it should be understood that various other changes, substitutions, and alterations may be made hereto without departing from the spirit and scope of the present invention. For example, although the present invention has been described with reference to a number of elements included within system 10, these elements may be rearranged or positioned in order to accommodate any suitable processing and communication architectures. In addition, any of the described elements may be provided as separate external components to system 10 or to each other where appropriate. The present invention contemplates great flexibility in the arrangement of these elements, as well as their internal components. Moreover, the algorithms (inclusive of Boolean expressions) presented herein may be provided in any suitable element, component, or object. Such architectures may be designed based on particular processing needs where appropriate.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method for reducing transitions on a bus, comprising:
   receiving an input trace;
   constructing a Markov source correlating to the input trace; and
   identifying an encoding technique, which can either minimize or maximize an objective function associated with the input trace, wherein the encoding reflects a one-to-one mapping, and wherein a number of states is approximately equal to a number of different addresses that appear in the trace, whereby a number of edges is approximately equal to a number of different two-address sequences that appear in the trace.

2. A method for reducing transitions on a bus, comprising:
   receiving an input trace;
   constructing a Markov source correlating to the input trace; and
   identifying an encoding technique, which can either minimize or maximize an objective function associated with the input trace, wherein the encoding technique minimizes switching activities associated with a corresponding address bus, and wherein a number of states is approximately equal to a number of different addresses that appear in the trace, whereby a number of edges is approximately equal to a number of different two-address sequences that appear in the trace.

3. A method for reducing transitions on a bus, comprising:
   receiving an input trace;
   constructing a Markov source correlating to the input trace; and
   identifying an encoding technique, which can either minimize or maximize an objective function associated with the input trace, wherein the encoding technique includes usage of a T0 encoding in order to reduce a size associated with the Markov source, and wherein a number of states is approximately equal to a number of different addresses that appear in the trace, whereby a number of edges is approximately equal to a number of different two-address sequences that appear in the trace.

4. The method of claim 3, wherein the T0 encoding reduces a number of nodes in the Markov source.

5. A method for reducing transitions on a bus, comprising:
   receiving an input trace;
   constructing a Markov source correlating to the input trace;

identifying an encoding technique, which can either minimize or maximize an objective function associated with the input trace; and constructing a circuit, which models the objective function associated with the input trace, wherein each gate of the circuit can be modeled using one or more expressions, and wherein a number of states is approximately equal to a number of different addresses that appear in the trace, whereby a number of edges is approximately equal to a number of different two-address sequences that appear in the trace.

6. The method of claim 5, further comprising:

identifying a value of the objective function, wherein a comparator circuit can be used to find out whether the value of the objective function is less than a constant.

7. The method of claim 6, further comprising:

utilizing a Boolean satisfiability solver to find a solution for one or more of the expressions.

8. A method for reducing transitions on a bus, comprising:

receiving an input trace;

constructing a Markov source correlating to the input trace;

identifying an encoding technique, which can either minimize or maximize an objective function associated with the input trace;

receiving data that is encoded using the encoding technique; and decoding the received data in order to retrieve the input trace, wherein a number of states is approximately equal to a number of different addresses that appear in the trace, whereby a number of edges is approximately equal to a number of different two-address sequences that appear in the trace.

9. A system for reducing transitions on a bus, comprising:

means for receiving an input trace;

means for constructing a Markov source correlating to the input trace; and means for identifying an encoding technique, which can either minimize or maximize an objective function associated with the input trace, wherein the encoding reflects a one-to-one mapping, and wherein a number of states is approximately equal to a number of different addresses that appear in the trace, whereby a number of edges is approximately equal to a number of different two-address sequences that appear in the trace.

10. A system for reducing transitions on a bus, comprising:

means for receiving an input trace;

means for constructing a Markov source correlating to the input trace; and means for identifying an encoding technique, which can either minimize or maximize an objective function associated with the input trace, wherein the encoding technique minimizes switching activities associated with a corresponding address bus, and wherein a number of states is approximately equal to a number of different addresses that appear in the trace, whereby a number of edges is approximately equal to a number of different two-address sequences that appear in the trace.

11. A system for reducing transitions on a bus, comprising:

means for receiving an input trace;

means for constructing a Markov source correlating to the input trace; and means for identifying an encoding technique, which can either minimize or maximize an objective function associated with the input trace, wherein the encoding technique includes usage of a T0 encoding in order to reduce a size associated with the Markov source, and wherein a number of states is approximately equal to a number of different addresses that appear in the trace, whereby a number of edges is approximately equal to a number of different two-address sequences that appear in the trace.

12. The system of claim 11, wherein the T0 encoding reduces a number of nodes in the Markov source.

13. A system for reducing transitions on a bus, comprising:

means for receiving an input trace;

means for constructing a Markov source correlating to the input trace means for identifying an encoding technique, which can either minimize or maximize an objective function associated with the input trace; and means for constructing a circuit, which models the objective function associated with the input trace, wherein each gate of the circuit can be modeled using one or more expressions, and wherein a number of states is approximately equal to a number of different addresses that appear in the trace, whereby a number of edges is approximately equal to a number of different two-address sequences that appear in the trace.

14. The system of claim 13, further comprising:

means for identifying a value of the objective function, wherein a comparator circuit can be used to find out whether the value of the objective function is less than a constant.

15. The system of claim 14, further comprising:

means for utilizing a Boolean satisfiability solver to find a solution for one or more of the expressions.

16. A system for reducing transitions on a bus, comprising:

means for receiving an input trace;

means for constructing a Markov source correlating to the input trace;

means for identifying an encoding technique, which can either minimize or maximize an objective function associated with the input trace; and means for receiving data that is encoded using the encoding technique; and means for decoding the received data in order to retrieve the input trace, and wherein a number of states is approximately equal to a number of different addresses that appear in the trace, whereby a number of edges is approximately equal to a number of different two-address sequences that appear in the trace.

17. Software for reducing transitions on a bus, the software being embodied in a computer readable medium and comprising computer code such that when executed is operable to:

receive an input trace;

construct a Markov source correlating to the input trace; and identify an encoding technique, which can either minimize or maximize an objective function associated with the input trace, wherein the encoding reflects a one-to-one mapping, and wherein a number of states is approximately equal to a number of different addresses that appear in the trace, whereby a number of edges is approximately equal to a number of different two-address sequences that appear in the trace.

18. Software for reducing transitions on a bus, the software being embodied in a computer readable medium and comprising computer code such that when executed is operable to:
- receive an input trace;
- construct a Markov source correlating to the input trace; and
- identify an encoding technique, which can either minimize or maximize an objective function associated with the input trace, wherein the encoding technique minimizes switching activities associated with a corresponding address bus, and wherein a number of states is approximately equal to a number of different addresses that appear in the trace, whereby a number of edges is approximately equal to a number of different two-address sequences that appear in the trace.

19. Software for reducing transitions on a bus, the software being embodied in a computer readable medium and comprising computer code such that when executed is operable to:
- receive an input trace;
- construct a Markov source correlating to the input trace; and
- identify an encoding technique, which can either minimize or maximize an objective function associated with the input trace, wherein the encoding technique includes usage of a T0 encoding in order to reduce a size associated with the Markov source, and wherein a number of states is approximately equal to a number of different addresses that appear in the trace, whereby a number of edges is approximately equal to a number of different two-address sequences that appear in the trace.

20. The medium of claim 19, wherein the T0 encoding reduces a number of nodes in the Markov source.

21. Software for reducing transitions on a bus, the software being embodied in a computer readable medium and comprising computer code such that when executed is operable to:
- receive an input trace;
- construct a Markov source correlating to the input trace;
- identify an encoding technique, which can either minimize or maximize an objective function associated with the input trace; and
- construct a circuit, which models the objective function associated with the input trace, wherein each gate of the circuit can be modeled using one or more expressions, and wherein a number of states is approximately equal to a number of different addresses that appear in the trace, whereby a number of edges is approximately equal to a number of different two-address sequences that appear in the trace.

22. The medium of claim 21, wherein the code is further operable to: identify a value of the objective function, wherein a comparator circuit can be used to find out whether the value of the objective function is less than a constant.

23. Software for reducing transitions on a bus, the software being embodied in a computer readable medium and comprising computer code such that when executed is operable to:
- receive an input trace;
- construct a Markov source correlating to the input trace;
- identify an encoding technique, which can either minimize or maximize an objective function associated with the input trace;
- receive data that is encoded using the encoding technique; and
- decode the received data in order to retrieve the input trace, and wherein a number of states is approximately equal to a number of different addresses that appear in the trace, whereby a number of edges is approximately equal to a number of different two-address sequences that appear in the trace.

24. An apparatus for reducing transitions on a bus, comprising:
- an encoder that is operable to receive an input trace, wherein a Markov source is constructed that correlates to the input trace, and wherein an encoding technique is identified that can either minimize or maximize an objective function associated with the input trace, wherein the encoding reflects a one-to-one mapping, and wherein a number of states is approximately equal to a number of different addresses that appear in the trace, whereby a number of edges is approximately equal to a number of different two-address sequences that appear in the trace.

25. An apparatus for reducing transitions on a bus, comprising:
- an encoder that is operable to receive an input trace, wherein a Markov source is constructed that correlates to the input trace, and wherein an encoding technique is identified that can either minimize or maximize an objective function associated with the input trace, wherein the encoding technique minimizes switching activities associated with a corresponding address bus that is coupled to the encoder, and wherein a number of states is approximately equal to a number of different addresses that appear in the trace, whereby a number of edges is approximately equal to a number of different two-address sequences that appear in the trace.

26. An apparatus for reducing transitions on a bus, comprising:
- an encoder that is operable to receive an input trace, wherein a Markov source is constructed that correlates to the input trace, and wherein an encoding technique is identified that can either minimize or maximize an objective function associated with the input trace, wherein the encoding technique includes usage of a T0 encoding in order to reduce a size associated with the Markov source, and wherein a number of states is approximately equal to a number of different addresses that appear in the trace, whereby a number of edges is approximately equal to a number of different two-address sequences that appear in the trace.

27. The apparatus of claim 26, wherein the T0 encoding reduces a number of nodes and edges in the Markov source.

28. An apparatus for reducing transitions on a bus, comprising:
- an encoder that is operable to receive an input trace, wherein a Markov source is constructed that correlates to the input trace, and wherein an encoding technique is identified that can either minimize or maximize an objective function associated with the input trace, wherein a circuit is constructed that models the objective function associated with the input trace, and wherein each gate of the circuit can be modeled using one or more expressions, and wherein a number of states is approximately equal to a number of different addresses that appear in the trace, whereby a number of edges is approximately equal to a number of different two-address sequences that appear in the trace.

29. The apparatus of claim 28, further comprising:
- a comparator circuit, wherein a value of the objective function is identified, and wherein the comparator circuit can be used to find out whether the value of the objective function is less than a constant.

30. The apparatus of claim 29, further comprising:
a Boolean satisfiability solver operable to find a solution for one or more of the expressions.

31. An apparatus for reducing transitions on a bus, comprising:
an encoder that is operable to receive an input trace, wherein a Markov source is constructed that correlates to the input trace, and wherein an encoding technique is identified that can either minimize or maximize an objective function associated with the input trace; and
a decoder operable to receive data that is encoded using the encoding technique, wherein the decoder is operable to decode the received data in order to retrieve the input trace, and wherein a number of states is approximately equal to a number of different addresses that appear in the trace, whereby a number of edges is approximately equal to a number of different two-address sequences that appear in the trace.

32. The apparatus of claim 31, further comprising:
an address bus coupled to the encoder and operable to facilitate the propagation of data generated by the encoder.

33. The apparatus of claim 32, further comprising:
a memory coupled to the address bus; and
a data bus, wherein the memory is operable to provide data from the memory that may propagate along the data bus.

34. The apparatus of claim 33, further comprising:
a microprocessor coupled to the encoder and operable to perform one or more tasks associated with data retrieval from the memory.

* * * * *